(No Model.)
N. S. KEITH.
SECONDARY BATTERY.
No. 273,855. Patented Mar. 13, 1883.
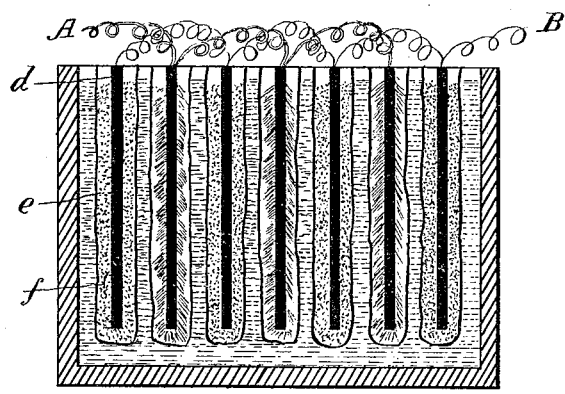
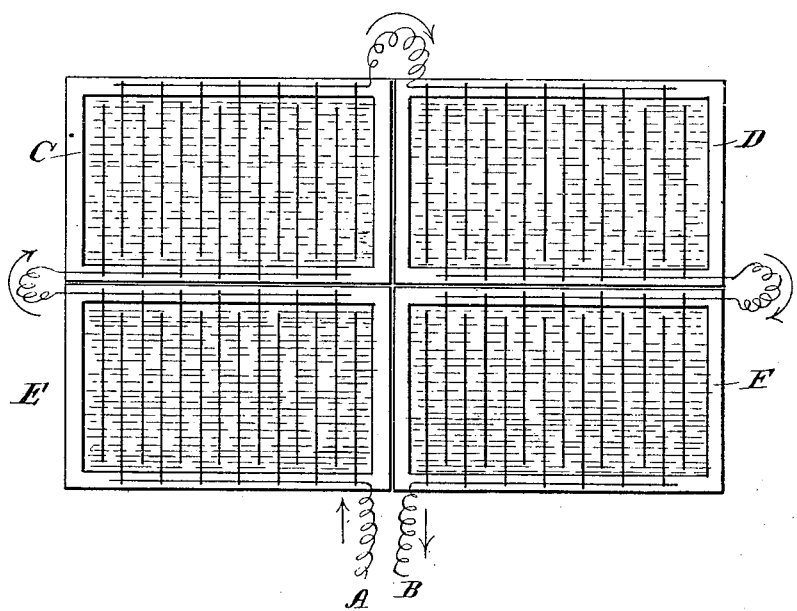
WITNESSES:
John W. Ripley
Oscar Mather
INVENTOR.
Nathaniel Shepard Keith
by S. J. Gordon, his Atty.

UNITED STATES PATENT OFFICE.

NATHANIEL S. KEITH, OF NEW YORK, N. Y., ASSIGNOR TO THE AMERICAN ELECTRIC STORAGE COMPANY, OF NEWARK, NEW JERSEY.

SECONDARY BATTERY.

SPECIFICATION forming part of Letters Patent No. 273,855, dated March 13, 1883.

Application filed January 31, 1883. (No model.)

*To all whom it may concern:*

Be it known that I, NATHANIEL SHEPARD KEITH, of New York, county of New York, State of New York, have invented a new and useful Improvement in Secondary Batteries, which is fully set forth in the following specification and accompanying drawings, in which—

Figure 1 represents a section at right angles to the faces of the plates of a single cell.

My improvement relates to the kind of secondary battery commonly known as that of "Planté," inasmuch as it depends upon oxidation and reduction of lead.

It has for its object cheapness and ease of manufacture, increased electrical efficiency and capacity, and other desirable practical requirements.

The improvement hereinafter described and claimed is a part of my invention described in my application for United States Letters Patent filed June 6, A. D. 1882. This part of my invention consists of the combination of a positive electrode the active part of which is finely-divided metal deposited thereon by electro-deposition, and a negative electrode the active part of which is a spongy metallic compound deposited thereon by electro-deposition, either one or both electrodes being contained in a porous envelope or receptacle.

A is the terminal of the wire which connects all the plates of one kind, and B the terminal of the wire which connects all the plates of the other kind in the manner well known, as for "quantity" or "multiple arc" in ordinary galvanic batteries.

The letter *d* points to the conducting-core or lead plate; *e*, to a porous envelope, (in this case having the form of a bag,) and *f* to the spongy material, either metallic or oxidized. Fig. 2 represents four such cells, C, D, E, and F, in plan view. The plates in each cell are arranged for quantity, while the cells are placed in series, after a well-known arrangement. The ends A and B represent the terminals of the circuit, and the arrows the direction of the current when receiving the charge, which direction is reversed during discharge.

The efficiency and capacity of a secondary battery of this kind depend upon the amount of porous or spongy metallic lead, as well as upon the amount of similarly-constituted lead oxide which can be placed and retained in contact with the surfaces of the plates, or other forms of materials which are used to support these spongy materials or contain them.

I have found in practice that any desirable amount of either spongy lead oxide or spongy metallic lead can be deposited upon electrodes by electrolysis, or, rather, semi-electrolytic action in certain kinds of solutions of lead, and that these deposits may be kept upon the electrodes by enveloping them in bags, wrappers, cases, cells, or like equivalents, either before or after the formation of the spongy deposits, and that the electrodes so prepared are very effective in secondary batteries.

In practicing my invention I take a solution of some salt of lead—such as the acetate or the nitrate—which solution must be either neutral or, better, alkaline in its reaction, and use that for a bath, in which I suspend two or more sheets or other forms of lead, as electrodes, connected in alternate order with the positive and negative poles of a source of electricity. These solutions are imperfect electrolytes—that is to say, they do not allow of perfect electrolysis, but, instead of dissolving the anode and depositing metallic lead upon the cathode, as in true electrolysis, oxides of lead are formed upon both the positive and negative electrodes. It is necessary to use for the formation of these deposits solutions of lead which suffer decomposition under an electric current—such as the neutral or alkaline solutions of nitrate, chloride, or acetate of lead, or those salts called the "plumbates"—either in water alone or in solutions of other salts. I inclose the electrodes in bags or other containers made of fibrous material, which will allow the passage of the electrolyte through their meshes, but will also retain the oxides in contact with the electrodes which they incase. This I have done before placing the electrodes in the electrolyte, and before connection was made with the source of electricity, and have retained the bags upon the electrodes for the purpose of keeping the deposits upon the different electrodes from mixing. As the deposits are coherent, I have sometimes omitted the bags while making the deposits and have placed them on the electrodes after the deposits were formed. In this way any desirable thickness of oxides of lead deposits may be formed. After passing electric currents through such an arrangement of lead electrodes and solution, if the source of electricity be removed and the lead electrodes be electrically connected, a current of electricity will flow through the electrodes, (composed of the plates or supports,) solution, and conductor, but in the opposite direction to that from the original source. The duration of this return-current is in proportion to the amount of oxides which have been deposited on the electrodes. So it is desirable to continue the original current of electricity as long as it may be found practically expedient, in order to have as much of the oxides as possible on the supports and in the containers.

I believe that the deposits made by my invention on the negative electrode is a suboxide of lead, while that upon the positive electrode is the peroxide or a superoxide of lead. Lead suffers so many degrees of oxidation that I cannot say positively the exact degrees which take place in every case. Under the conditions of action, as a battery, the electrodes having the suboxide are electro-positive to those having the superoxide. Consequently an electric current flows when an electric circuit is made connecting the two kinds of electrodes.

It will be noticed that the electrodes which are electro-positive while under the action of an external source of electricity become electro-negative when the source is disconnected, and the same conversely with the opposite electrodes.

In order to increase the electro-motive force of such a battery, I take these electrodes so prepared and immerse them in a conducting-liquid in which lead is nearly or, better, quite insoluble. A mixture of one part of sulphuric acid with ten or twelve of water answers the purpose very well. If the electrodes have retained their positive and negative relation, current will flow, as before, until the deposits of both kinds have assumed the condition of protoxide. If I pass a current of electricity through this arrangement, the oxide on the electrodes, in connection with the positive pole of the source of electricity, will be superoxidized or peroxidized, and those in connection with the negative pole will be reduced to a metallic condition. These electrodes thus again assume a relative positive and negative condition, which causes a current of electricity to flow through a galvanic circuit of which they form a part.

I have made my electrodes by the following process—namely, by depositing finely-divided crystalline metallic lead upon plates of lead under my Patents No. 209,056, dated October 15, 1878, and No. 215,463, dated May 20, 1879, and subsequently oxidizing the deposits on those to be used as the negative electrodes of a secondary battery by electrical action, in the manner hereinbefore described.

I have for the purpose of increasing the electro-motive force of my electrodes arranged numbers of them in a series of vats or cells placed in immediate continuity, so that the current flows from the electro-negative electrodes of one cell to the electro-positive electrodes of the next cell, and so on through the series, in a manner analogous to connecting galvanic batteries. An efficient equivalent of this last arrangement may be had by making one large cell and dividing it into the desired number of small cells by water-tight non-conducting partitions and connecting the electrodes, same as before.

I am aware that oxides have been formed upon lead electrodes by the action of electricity, notable in the case of the well-known Planté secondary battery; but such oxides were formed from the lead of the electrodes themselves by decomposition of water on their surfaces, not, as in my improvement, deposited from a solution of lead in which the electrodes are immersed. In the case of the Planté battery the oxide is formed in sufficient quantity for even small uses only after very many charging and discharging operations, taking time and expense. By my invention the electrodes are formed or prepared to any degree of efficiency during one operation.

This patent is intended to cover nothing except what is set forth in the ensuing claim. I specifically disclaim all other novel features that may have been referred to in the foregoing description, since they will be covered in my aforementioned application and subdivisions thereof other than this one.

What I claim, and desire to secure by Letters Patent, is—

In a secondary battery, the combination of a positive electrode the active part of which is finely-divided metal deposited thereon by electro-deposition, and a negative electrode the active part of which is a spongy metallic compound deposited thereon by electro-deposition, either one or both electrodes being contained in a porous envelope or receptacle.

N. S. KEITH.

Witnesses:
JOHN W. RIPLEY,
S. J. GORDON.